United States Patent

Chuang

[11] Patent Number: 5,528,982
[45] Date of Patent: Jun. 25, 1996

[54] GAS-COOKER FRAME

[76] Inventor: Chang-Feng Chuang, No. 30, Lane 332, Ming-Chuan Rd., Chia I City, Taiwan

[21] Appl. No.: 491,700

[22] Filed: Jun. 19, 1995

[51] Int. Cl.⁶ ............................................. A47J 37/00
[52] U.S. Cl. ........................... 99/446; 99/400; 126/39 R; 126/39 E; 126/41 R
[58] Field of Search ........................... 99/337, 444–446, 99/400, 401, 447, 449, 375, 330; 126/41 R, 39 E, 39 R, 299 D, 37 R, 41 E

[56] References Cited

U.S. PATENT DOCUMENTS

| | | | |
|---|---|---|---|
| 3,563,158 | 2/1971 | Omer | 99/336 |
| 4,210,123 | 7/1980 | Moore et al. | 99/330 |
| 4,324,173 | 4/1982 | Moore et al. | 99/408 |
| 4,705,018 | 11/1987 | Beach | 126/39 R |
| 4,705,019 | 11/1987 | Beach et al. | 126/299 D |
| 4,705,021 | 11/1987 | Beach | 126/41 R |
| 4,729,297 | 3/1988 | Iranzadi | 99/447 |
| 4,736,729 | 4/1988 | Beach | 126/37 R |
| 4,750,470 | 6/1988 | Beach et al. | 126/299 D |

*Primary Examiner*—Timothy F. Simone
*Attorney, Agent, or Firm*—Morton J. Rosenberg; David I. Klein

[57] ABSTRACT

A gas-cooker frame is provided. The gas-cooker frame includes a gas-cooker stand, a drain frame and several springs. The gas-cooker stand is disposed on the gas-cooker base. The upper end of the gas-cooker stand has an open tube-shape. The stand has a base-plate with a central hole formed therein to form an open passage for providing a space for a gas flame. Several brackets are disposed around the interior of the gas-cooker stand for suspension of a drain frame by springs. The drain frame has a collector ring with drain grooves extending obliquely downward therefrom. The springs maintain the collector ring of the drain frame in contact with the bottom of a pot placed thereon.

3 Claims, 4 Drawing Sheets

5,528,982

GAS-COOKER FRAME

BACKGROUND OF THE INVENTION

1. Field of the Invention

The present invention relates to a gas-cooker frame. More particularly, the present invention is directed to a frame that prevents the flame from being put out when such liquids as soup are spilled over during cooking.

In modern daily life, a gas-cooker is one indispensable kitchen utensil of every family. Many delicious dishes are stewed slowly on the fire of gas-cookers. During stewing, or boiling water, often the fire is not being attended to, such that if the boiling soup or water spills over and flows into the chamber of the cooker it douses out the flame, causing gas leakage. Such can lead to gas poisoning or conflagration, in a word, it is quite dangerous.

Conventional gas-cookers are not designed with any means of preventing liquids being heated from flowing over, so unexpected accidents caused by such gas-cookers often happen.

An object of the present invention is to provide a gas-cooker frame having the effect of preventing the flame from being put out by soup overflowing from the pot, and thereby avoiding gas leakage, while collecting the spilled soup, making the base of the gas-cooker more easily cleaned.

SUMMARY OF THE INVENTION

The invention includes a gas-cooker stand, a drain frame, and several springs joining them. The gas-cooker stand is disposed on the gas-cooker base, its top end has an open tube-shape. The base-plate of the gas-cooker stand is elevated at the center relative to its edges. A hole is formed at the center, which is larger than the burner of the gas-cooker. The edge of the top end of the gas-cooker has several sawtooth-shaped brackets, each bracket having a hole formed through its front end. At the bottom corner of the gas-cooker stand a water outlet is formed, and closed by a pin. The drain frame has a collector ring having a cross-sectional contour in the form of a U-shaped groove, with its inner edge being higher than the outer edge thereof. Along the upper inner edge of the collector there is formed a support plane extending inwardly toward the center thereof. Along the outer edge of the collector ring, several drain grooves are formed in correspondence with the brackets of the gas-cooker stand. The drain grooves have a U-shaped contour and extend from the collector ring obliquely downward. The lower end of each drain groove has a flat portion, and a hole formed in the oblique portion adjacent the flat portion. The upper and lower ends of each spring are formed with hooks, the hooks being engaged with the hole of the gas-cooker stand and the hole of drain groove of the drain frame, for hanging the drain frame from the gas-cooker stand, the support plane being disposed slightly higher than the bracket of the gas-cooker stand.

DESCRIPTION OF THE PREFERRED EMBODIMENT

Figure 1:
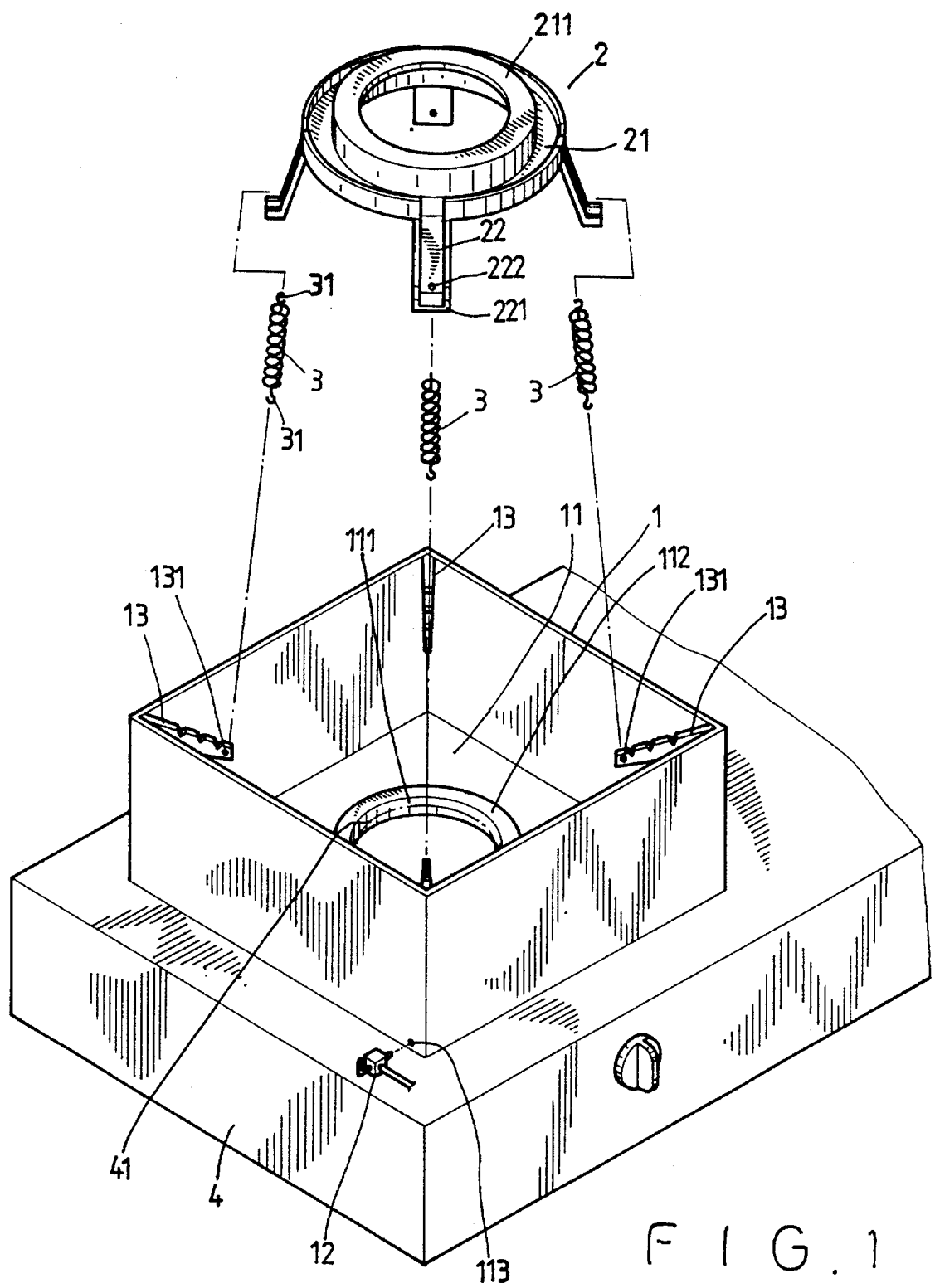
FIG. 1 is an exploded perspective view of the present invention.

Referring to FIG. 1, the present invention includes a gas-cooker stand 1, a drain frame 2 and several springs 3.

The gas-cooker stand I is disposed on the gas-cooker 4 and has an upper end having an open tube-shape. The base-plate 11 of gas-cooker stand 1 is elevated at its center relative to its edges, and has a through hole defining an open passage 111 formed therein with a shoulder 112. Located at the corner of the base-plate 11 there is provided a water outlet 113 closed by a pin 12. At the upper end of gas-cooker stand 1 there is provided several sawtooth-shaped brackets 13, each bracket having a hole 131 formed at the distal end thereof.

The drain frame 2 has a collector ring 21, having cross-sectional contour in the form of a U-shaped groove. The inner edge of the collector ring 21 is higher than the outer edge thereof. Along the upper inner edge of collecting ring 21 there is formed a support plane 211 extending inwardly toward the center thereof. Several drain grooves 22 are formed around the outer edge of the collector ring 21 in correspondence with the brackets 13 of the gas-cooker stand 1. Each of the drain grooves 22 extend obliquely downward from the collector ring 21. At the lower end of each drain groove 22 a flat portion 221 is formed, and a hole 222 is formed in the oblique portion adjacent the flat portion 221. A plurality of springs 3 are provided, each spring 3 having a hook 31 respectively formed on both ends thereof.

Figure 2:
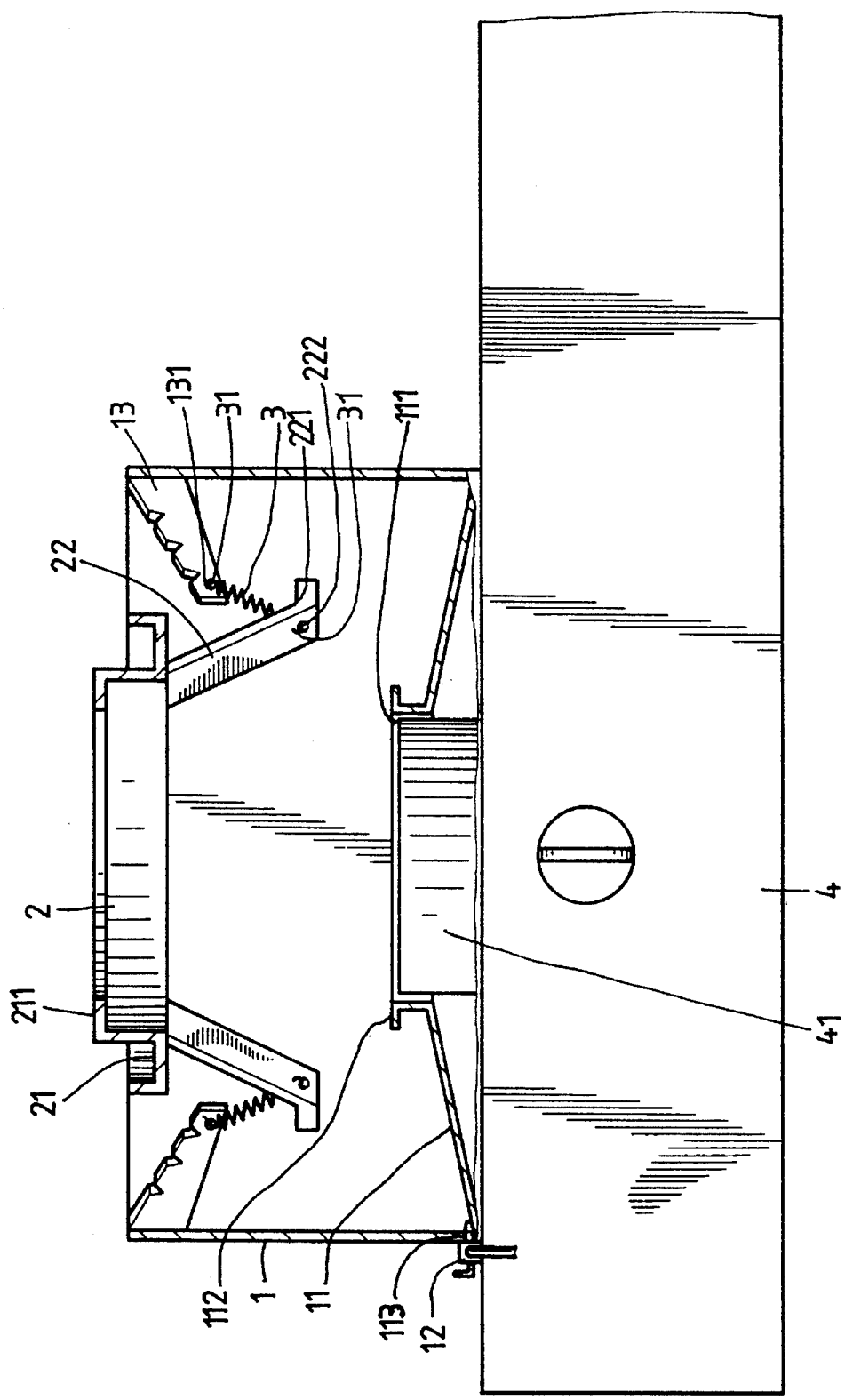
FIG. 2 is a side elevation view of the present invention.

During assembly, referring to FIG. 2, the upper and lower hooks 31 of each spring 3 are hooked individually through the hole 131 of a respective bracket 13 of the gas-cooker stand 1 and the hole 22 of a corresponding drain groove 22 of the drain frame 2 for hanging the drain frame 2 into the center of the gas-cooker stand 1. The flat portion 221 of the drain grooves 22 are hung above the edge of the open passage 111, and the support plane 211 of the collector ring 21 of the drain frame 2 is located higher than the bracket 13 of the gas-cooker stand 1 by the springs 3.

Figure 3:
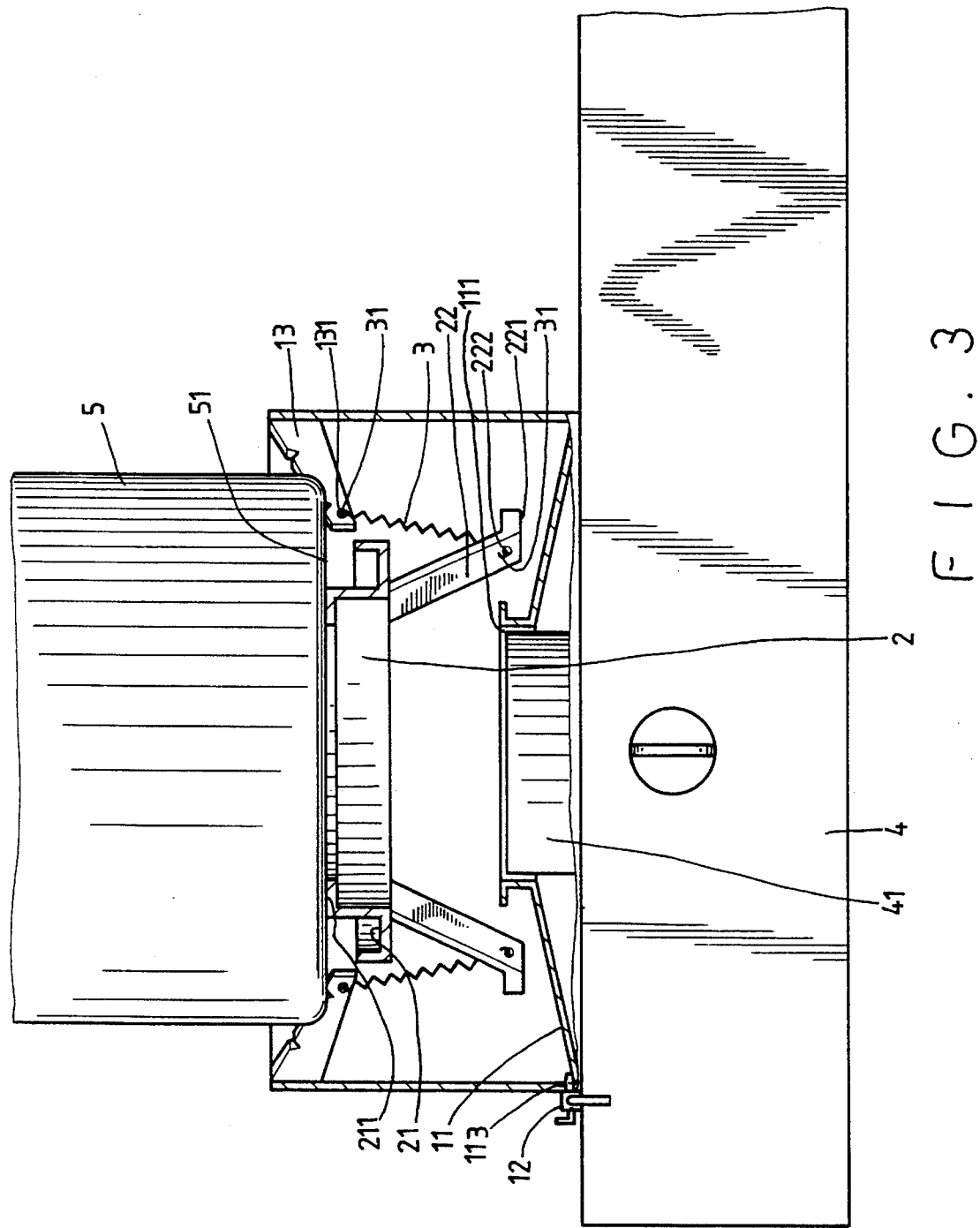
FIG. 3 is a side elevation view showing an operation of the present invention; and, FIG. 4 is a side elevation view showing another operation of the present invention.
Figure 4:
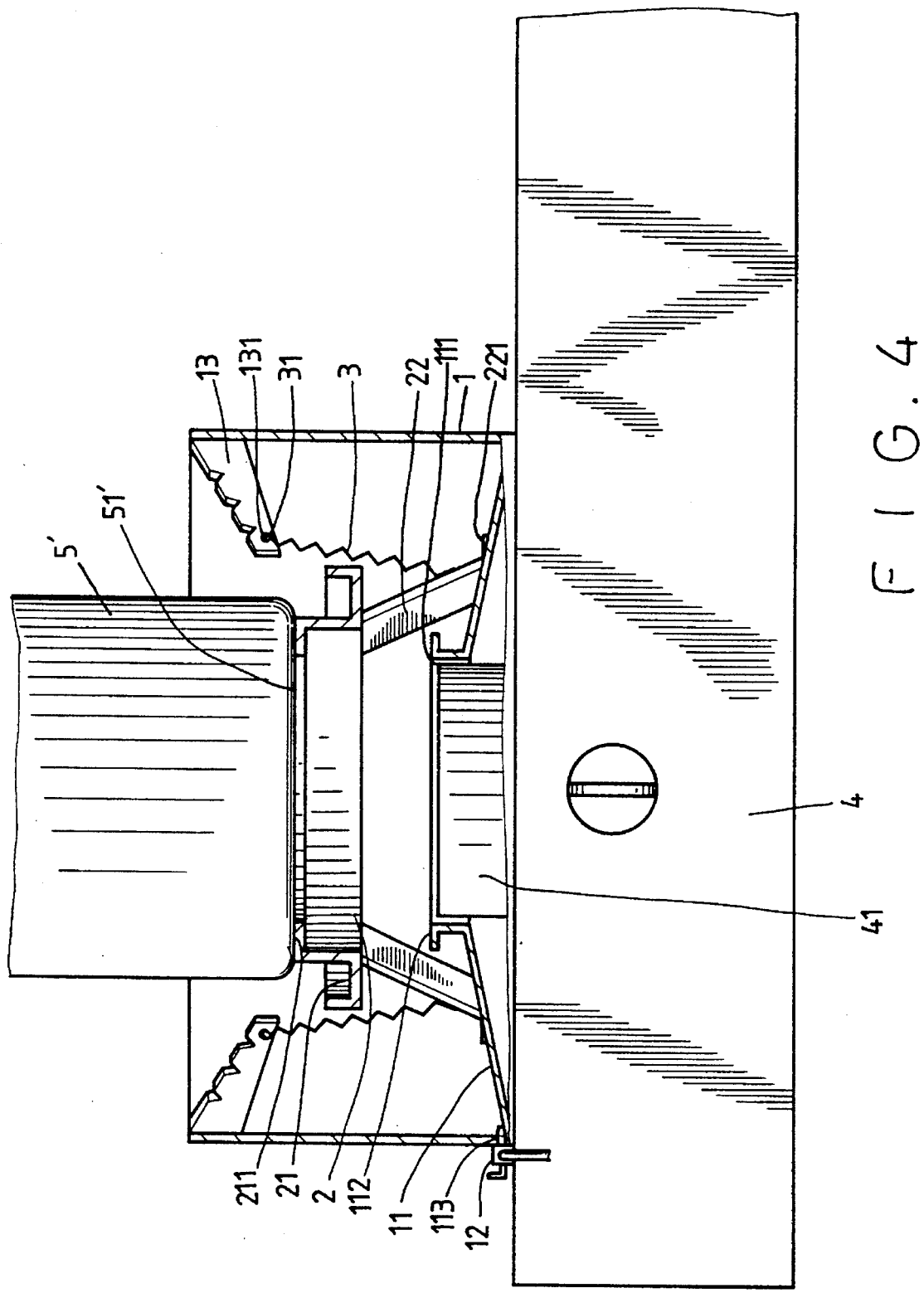

During use, with reference to FIG. 3 and FIG. 4, where FIG. 3 shows a large size pot 5, the pot 5 is placed on the brackets 13 of the gas-cooker 1. The sawtooth shape of the brackets holds the pot 5 stably thereon. The pot bottom 51 presses down the support plane 211 of the collector ring 21 of the drain frame 2, and the spring force applied to it presses the support plane 211 of the collector ring 21 upward to contact the pot bottom 51, contiguously without any gap. If the soup in the pot overflows, it flows down along the outside wall of the pot 5 to the pot bottom 51. Some of the spillage drops into the base-plate 11, the rest will flow along the pot bottom 51 to the support plane 211 and into the U-shaped groove of the collector ring 21. From the groove of collector ring 21, the fluid will flow out along the drain grooves 22 and down to the base-plate 11 of the gas-cooker stand 1. The spilled fluid will collect in the low-lying area around the open passage 111 of the base-plate 11. After the pot 5 is removed, and the gas-cooker stand has cooled, the pin 12 can be removed to permit the fluid collected in the base-plate 11 to flow out.

If a smaller size pot 5' is used, with reference to FIG. 4, the pot 5' will be too small to place on the brackets 13. Therefore, the pot bottom 51' presses on the support plane 211 of the collector ring 21 of the drain frame 2 directly. The weight of the pot 5' presses the drain frame 2 down, and the flat portions 221 of the drain grooves 22 rest on the base-plate 11 of the gas-cooker stand 1. The springs 3 are extended, and therefore the pot bottom 51' may be closer to the chamber 41 of the gas-cooker base 4. In such a case, the flame should be turned down. Not only can gas be saved, but such also avoids the pot 5' from being blackened by a big flame. When liquid such as soup spills over, as mentioned above, it may flow through the U-shaped groove of collector ring 21 to the drain grooves 22 and be collected in the base-plate 11 of the gas-cooker stand 1. When the pot 5' is removed, the springs 3 will return the drain frame 2 to its original position. The soup can then be drained from the base-plate 11 as previously discussed.

I claim:

1. A gas-cooker frame for use on a gas-cooker base, comprising:

a gas-cooker stand disposed on the gas-cooker base, said gas-cooker stand having an open cavity and open upper end formed by a tubular wall and a base plate on a lower end of said tubular wall, said base plate having a centrally disposed aperture surrounded by a shoulder portion to define an open passage of a diameter larger than a diameter of a gas burner of the gas-cooker base, said gas-cooker stand having a plurality of sawtooth-shaped bracket members coupled to said tubular wall adjacent said upper end, each of said bracket members having a hole formed through a distal end thereof, said tubular wall having a drain opening disposed adjacent said base plate;

a drain frame disposed within said cavity, said drain frame being formed by an annular collector ring having a U-shaped cross-sectional contour, said collector ring having a planar inner edge defining an inwardly directed support plane and a plurality of drain grooves extending obliquely downward from an outer edge thereof, each of said drain grooves having a flat portion disposed at a distal end and a through opening formed therein adjacent said flat portion; and, a plurality of springs for suspending said drain frame from said gas-cooker stand, each of said springs having hooks formed on opposing ends thereof for coupling between said hole of a respective one of said plurality of bracket members and said through opening of a corresponding one of said plurality drain grooves.

2. The gas-cooker frame as recited in claim 1 where said base plate has a portion surrounding said open passage elevated relative to a portion of said base plate disposed adjacent said tubular wall.

3. The gas-cooker frame as recited in claim 1 where said inner edge of said collector ring is formed at a higher elevation than said outer edge of said collector ring.

* * * * *